(12) United States Patent
Yang et al.

(10) Patent No.: US 9,467,875 B2
(45) Date of Patent: Oct. 11, 2016

(54) METHOD FOR ESTIMATING ABS ZONE IN WIRELESS ACCESS SYSTEM AND APPARATUS FOR SAME

(71) Applicant: LG Electronics Inc., Seoul (KR)

(72) Inventors: Yoonoh Yang, Anyang-si (KR);
Suhwan Lim, Anyang-si (KR);
Manyoung Jung, Anyang-si (KR);
Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 14/394,673

(22) PCT Filed: Oct. 23, 2012

(86) PCT No.: PCT/KR2012/008706
§ 371 (c)(1),
(2) Date: Oct. 15, 2014

(87) PCT Pub. No.: WO2013/165060
PCT Pub. Date: Nov. 7, 2013

(65) Prior Publication Data
US 2015/0071100 A1 Mar. 12, 2015

Related U.S. Application Data

(60) Provisional application No. 61/641,839, filed on May 2, 2012.

(51) Int. Cl.
*H04W 4/00* (2009.01)
*H04W 24/02* (2009.01)
*H04L 27/26* (2006.01)
*H04L 5/00* (2006.01)

(52) U.S. Cl.
CPC .......... *H04W 24/02* (2013.01); *H04L 27/2666* (2013.01); *H04L 5/0023* (2013.01); *H04L 5/0048* (2013.01); *H04L 27/2675* (2013.01)

(58) Field of Classification Search
CPC ....... H04W 24/02; H04L 5/00; H04L 5/0048
USPC .................................................. 370/252, 329
See application file for complete search history.

(56) References Cited

U.S. PATENT DOCUMENTS

2011/0116437 A1 5/2011 Chen et al.
2012/0113844 A1* 5/2012 Krishnamurthy ..... H04L 1/0026
370/252

(Continued)

FOREIGN PATENT DOCUMENTS

KR 10-2012-0032414 A 4/2012
WO 2011-122833 A2 10/2011

*Primary Examiner* — Farah Faroul
(74) *Attorney, Agent, or Firm* — Dentons US LLP

(57) ABSTRACT

Disclosed in the present invention are a method for estimating an almost blank subframe (ABS) zone in a wireless access system in which a macro cell and a pico cell coexist, and an apparatus for same. More specifically, the present invention comprises the steps of measuring reference signal received power (RSRP) by using a cell-specific reference signal which is inserted into a subframe of the macro cell, and determining whether the format of the subframe is a multicast broadcast single frequency network (MBSFN) ABS by comparing an RSRP measurement value from a zeroth orthogonal frequency division multiplexing (OFDM) symbol of the subframe, and an RSRP measurement value from a symbol that is not the zeroth OFDM symbol.

10 Claims, 11 Drawing Sheets

(56) References Cited

U.S. PATENT DOCUMENTS

| | | | | |
|---|---|---|---|---|
| 2012/0164948 A1* | 6/2012 | Narasimha | H04W 72/1215 | 455/63.1 |
| 2012/0269143 A1* | 10/2012 | Bertrand | H04W 72/1231 | 370/329 |
| 2012/0327894 A1* | 12/2012 | Axmon | H04W 48/12 | 370/330 |
| 2012/0329400 A1* | 12/2012 | Seo | H04J 11/005 | 455/63.1 |
| 2013/0028199 A1* | 1/2013 | Song | H04W 16/12 | 370/329 |
| 2013/0114434 A1* | 5/2013 | Muruganathan | H04W 16/14 | 370/252 |
| 2013/0114435 A1* | 5/2013 | Wang | H04W 48/16 | 370/252 |
| 2013/0223400 A1* | 8/2013 | Seo | H04J 11/005 | 370/329 |
| 2014/0064133 A1* | 3/2014 | Kazmi | H04W 24/10 | 370/252 |
| 2014/0269355 A1* | 9/2014 | Monogioudis | H04W 24/02 | 370/252 |
| 2015/0131553 A1* | 5/2015 | Centonza | H04L 5/0032 | 370/329 |
| 2015/0295685 A1* | 10/2015 | Borst | H04L 5/0035 | 370/329 |
| 2015/0311877 A1* | 10/2015 | Li | H03G 3/3078 | 370/328 |
| 2015/0319738 A1* | 11/2015 | Fodor | H04W 24/10 | 370/330 |
| 2016/0150391 A1* | 5/2016 | Lee | H04W 56/002 | 370/329 |

* cited by examiner

Fig. 6
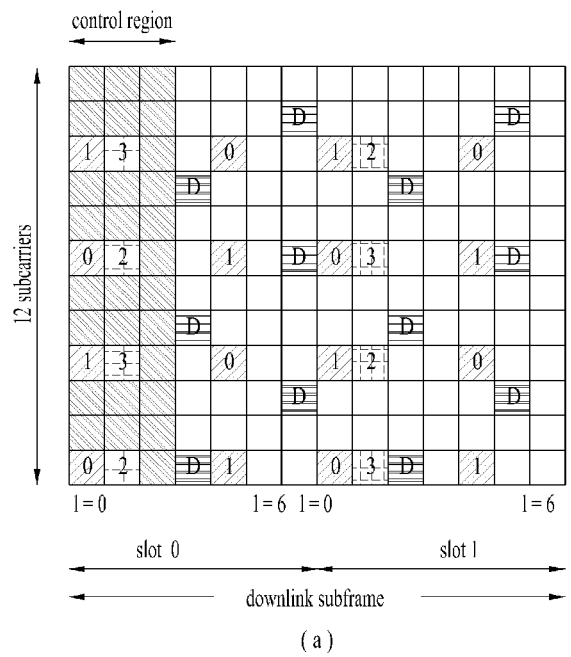
(a)
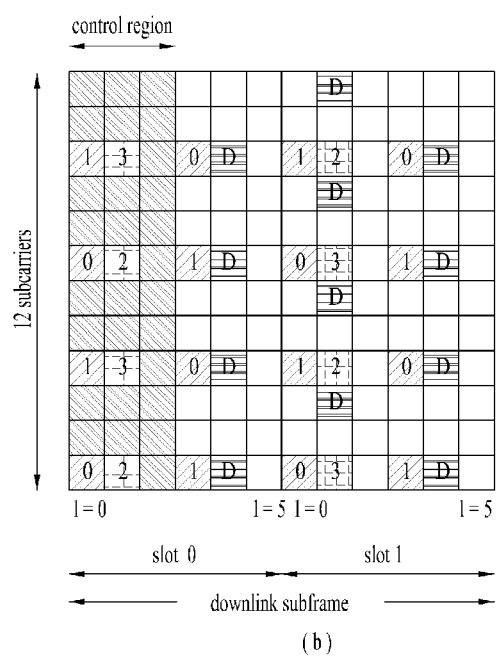
(b)

METHOD FOR ESTIMATING ABS ZONE IN WIRELESS ACCESS SYSTEM AND APPARATUS FOR SAME

This Application is a 35 U.S.C. §371 National Stage entry of International Application No. PCT/KR2012/008706, filed Oct. 23, 2012, which claims benefit of Provisional Application No. 61/641,839 filed May 2, 2012, both of which are incorporated by reference in their entirety herein.

TECHNICAL FIELD

The present invention relates to a wireless access system, and more particularly, to a method for estimating an almost blank subframe (ABS) zone in a wireless access system in which heterogeneous networks coexist, and an apparatus supporting the same.

BACKGROUND ART

A mobile communication system has been developed to provide audio services while assuring activities of users. However, the mobile communication system has been extended its coverage to data service as well as audio service, and has been currently developed to provide data services of high speed. More advanced mobile communication system has been required due to a lack of resources in the mobile communication system, which currently provides services, and a request of services of high speed from users.

One of important things in requirements of a next generation wireless access system should support a demand of a high data transmission rate. To this end, various technologies such as multiple input multiple output (MIMO), cooperative multiple point transmission (CoMP), and relay have been studied. In order to allow a radio data request, which has been rapidly increased, application of heterogeneous networks of a macro-pico or macro-femto has been increased.

However, a pico cell or a femto cell in the heterogeneous network environment is located within a macro cell. Under the circumstances, a problem occurs in that signals transmitted from the respective cells to a user equipment located at the boundary of cells which are overlapped with each other act as mutual interference.

DISCLOSURE

Technical Problem

An object of the present invention is to provide a method for estimating an almost blank subframe (ABS) zone in a wireless access system, preferably in an environment in which heterogeneous network base stations coexist, and an apparatus for the same.

Another object of the present invention is to provide a method for effectively estimating an ABS zone of a macro cell in an environment to which enhanced inter-cell interference coordination (eICIC) is applied, and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for allowing a user equipment to estimate an almost blank subframe (ABS) zone of a macro cell in a wireless access system in which the macro cell and a pico cell coexist comprises the steps of measuring reference signal received power (RSRP) by using a cell-specific reference signal which is inserted into a subframe of the macro cell; and determining whether a format of the subframe is a multicast broadcast single frequency network (MBSFN) ABS by comparing an RSRP measurement value from an orthogonal frequency division multiplexing (OFDM) symbol 0 of the subframe with an RSRP measurement value from a symbol other than the OFDM symbol 0.

In another aspect of the present invention, a user equipment for estimating an almost blank subframe (ABS) zone of a macro cell in a wireless access system in which the macro cell and a pico cell coexist comprises a radio frequency (RF) unit configured to transmit and receive a radio signal; and a processor configured to measure reference signal received power (RSRP) by using a cell-specific reference signal which is inserted into a subframe of the macro cell and determine whether a format of the subframe is a multicast broadcast single frequency network (MBSFN) ABS by comparing an RSRP measurement value from an orthogonal frequency division multiplexing (OFDM) symbol 0 of the subframe with an RSRP measurement value from a symbol other than the OFDM symbol 0.

Preferably, the format of the subframe is determined as MBSFN ABS if a difference value between the RSRP measurement value from the OFDM symbol 0 and any one of RSRP measurement values from OFDM symbols 4, 7 and 11 is greater than or smaller than a threshold value which is previously set.

Preferably, the format of the subframe is determined as MBSFN ABS if a difference value between the RSRP measurement value from the OFDM symbol 0 and an average value of RSRP measurement values from OFDM symbols 4, 7 and 11 is greater than or smaller than a threshold value which is previously set.

Preferably, the format of the subframe is determined as MBSFN ABS if a difference value between the RSRP measurement value from the OFDM symbol 0 and any one of RSRP measurement values from OFDM symbols 4, 7 and 11 is greater than a first threshold value, which is previously set, and is smaller than a second threshold value which is previously set.

Preferably, the format of the subframe is determined as MBSFN ABS if a difference value between the RSRP measurement value from the OFDM symbol 0 and an average value of RSRP measurement values from OFDM symbols 4, 7 and 11 is greater than a first threshold value, which is previously set, and is smaller than a second threshold value which is previously set.

Advantageous Effects

According to the embodiment of the present invention, an ABS zone may be estimated in a wireless access system, preferably in an environment in which heterogeneous network base stations coexist.

Also, according to the embodiment of the present invention, an ABS zone of a macro cell may be estimated effectively in an environment to which enhanced inter-cell interference coordination (eICIC) is applied.

Also, according to the embodiment of the present invention, throughput performance and a block error rate performance may be improved through effective estimation of an ABS zone.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6a and b are diagrams illustrating an example of a reference signal pattern mapped into a pair of downlink resource blocks (RBs) defined in a 3GPP LTE system;

BEST MODE FOR CARRYING OUT THE INVENTION

Figure 1:
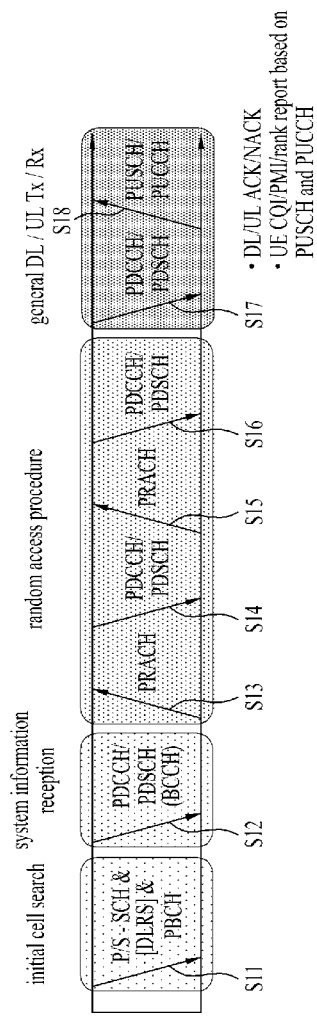
FIG. 1 is a diagram illustrating physical channels used in a 3GPP LTE system and a general method for transmitting a signal using the physical channels.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In this specification, the embodiments of the present invention have been described based on the data transmission and reception between a base station and a user equipment. In this case, the base station means a terminal node of a network, which performs direct communication with the user equipment. Herein, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station (BS) may be replaced with terms such as a fixed station, Node B, eNode B (eNB), and an access point (AP). A relay may be replaced with terms such as a relay node (RN) and a relay station (RS). Also, a 'terminal' may be replaced with terms such as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device.

Specific terminologies used in the following description are provided to assist understanding of the present invention, and various modifications may be made in the specific terminologies within the range that they do not depart from technical spirits of the present invention.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, steps or parts which are not described to clarify the technical spirits of the present invention may be supported by the above standard documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A.

1. 3GPP LTE/LTE-A System to which the Present Invention May be Applied

1. 1. General System

FIG. 1 is a diagram illustrating physical channels used in a 3GPP LTE system and a general method for transmitting a signal using the physical channels.

The user equipment, of which power is turned on, or which newly enters a cell, performs initial cell search such as synchronizing with the base station at step S11. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S12.

Afterwards, the user equipment may perform a random access procedure (RACH) such as steps S13 to S16 to complete access to the base station. To this end, the user equipment may transmit a preamble through a physical random access channel (PRACH) (S13), and may receive a response message to the preamble through the PDCCH and the PDSCH corresponding to the PDCCH (S14). In case of a contention based RACH, the user equipment may perform a contention resolution procedure such as transmission (S15) of additional physical random access channel and reception (S16) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S17) and transmit a physical uplink shared channel (PUSCH) and a physical uplink control channel (PUCCH) (S18), as a general procedure of transmitting uplink/downlink signals.

Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (channel quality indicator), PMI (precoding matrix indicator), RI (rank indication) information, etc.

Although the UCI is generally transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
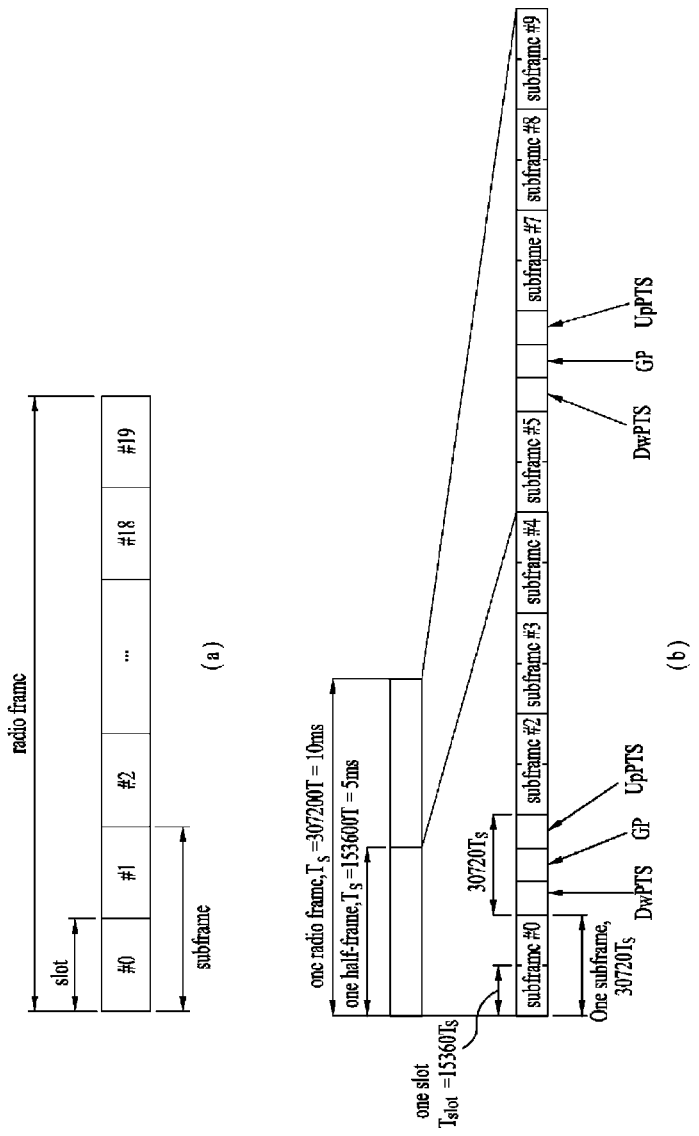
FIGS. 2a and b are diagrams illustrating a structure of a radio frame used in a 3GPP LTE system.

FIG. 2 is a diagram illustrating a structure of a radio frame in a 3GPP LTE system.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols is intended to express one symbol interval. The OFDM symbols may be referred to as one SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the five subframes includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

The aforementioned structure of the radio frame is only exemplary, and various modifications may be made in the number of subframes included in the radio frame or the number of slots included in the subframe, or the number of symbols included in the slot.

Figure 3:
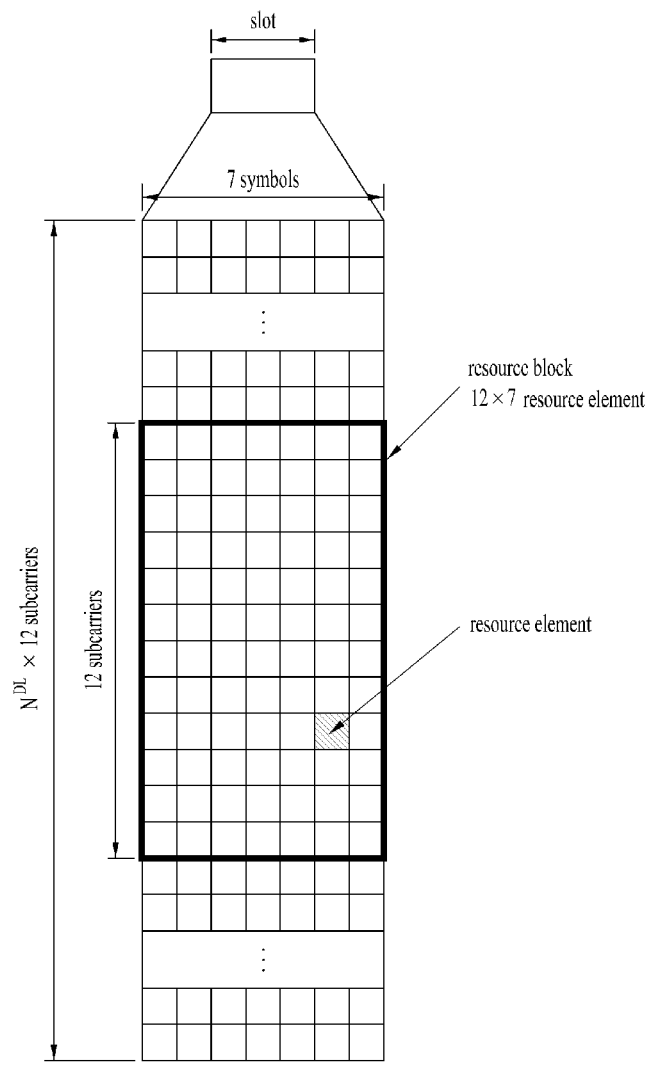
FIG. 3 is a diagram illustrating an example of a resource grid of one downlink slot.

FIG. 3 is a diagram illustrating a resource grid for a downlink slot used in an LTE system.

Referring to FIG. 3, one downlink slot includes a plurality of OFDM symbols in a time domain. In this case, one downlink slot includes, but not limited to, seven OFDM symbols, and one resource block (RB) includes, but not limited to, twelve subcarriers in a frequency domain.

Each element on the resource grid will be referred to as a resource element (RE). One resource block (RB) includes 12×7 resource elements. The number $N^{DL}$ of resource blocks (RBs) included in the downlink slot depends on a downlink transmission bandwidth. A structure of an uplink slot may be the same as that of the downlink slot.

Figure 4:
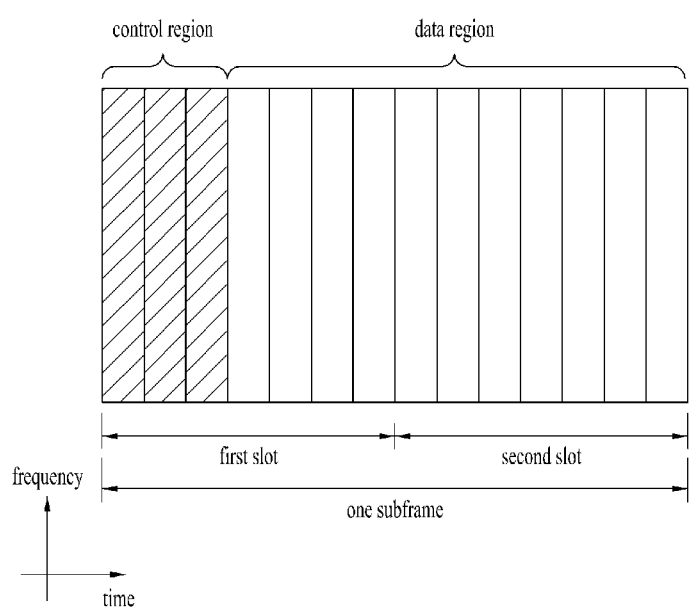
FIG. 4 is a diagram illustrating a structure of a downlink subframe.

FIG. 4 is a diagram illustrating a structure of a downlink subframe.

Referring to FIG. 4, maximum three OFDM symbols located at the front of the first slot within one subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel).

The PCFICH is transmitted from the first OFDM symbol of the subframe, and carries information on the number (that is, size of the control region) of OFDM symbols used for transmission of the control channels within the subframe. The PHICH is a response channel to uplink transmission, and carries HARQ ACK/NACK (acknowledgement/negative-acknowledgement) signal. The control information transmitted through the PDCCH will be referred to as downlink control information (DCI). The downlink control information (DCI) includes uplink resource allocation information, downlink resource allocation information, or uplink transmission (Tx) power control command for a random user equipment group.

The PDCCH may carry resource allocation and transport format (that may be referred to as downlink grant) of a downlink shared channel (DL-SCH), resource allocation information (that may be referred to as uplink grant) of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, and activity indication information of voice over Internet protocol (VoIP). A plurality of PDCCHs may be transmitted within the control region, and the user equipment may monitor the plurality of PDCCHs. The PDCCH is configured by aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCEs.

The base station determines a PDCCH format depending on the DCI which will be transmitted to the user equipment, and attaches cyclic redundancy check (CRC) to the control information. The CRC is masked with a unique identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indication identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI) to indicate a random access response which is a response to transmission of a random access preamble.

Figure 5:
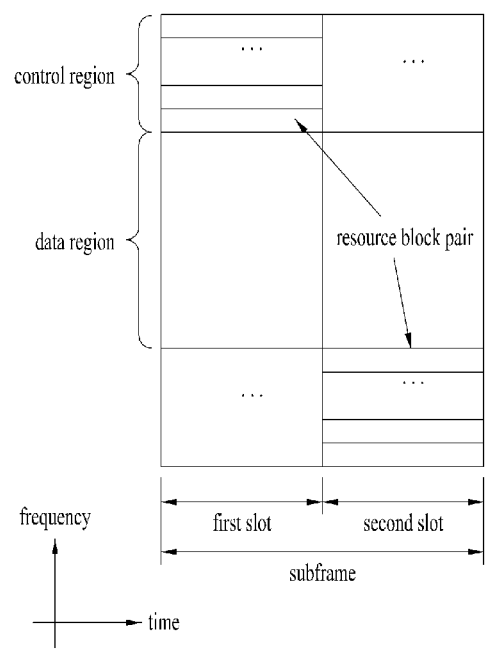
FIG. 5 is a diagram illustrating a structure of an uplink subframe.

FIG. 5 is a diagram illustrating a structure of an uplink subframe.

Referring to FIG. 5, the uplink subframe may be divided into a control region and a data region in a frequency domain. A physical uplink control channel (PUCCH) which carries uplink control information is allocated to the control region. A physical uplink shared channel (PUSCH) which carries user data is allocated to the data region. In order to maintain single carrier features, one user equipment does not transmit the PUCCH and the PUSCH at the same time. A resource block (RB) pair for the subframe is allocated to the PUCCH for one user equipment. Resource blocks (RBs) belonging to the RB pair reserve their respective subcarriers different from each other at each of two slots. The RB pair allocated to the PUCCH is subjected to frequency hopping at a slot boundary.

1.2. Downlink Reference Signal

Since data/signal) is transmitted through a radio channel in the wireless communication system, data/signal may be distorted on the radio during transmission. In order that a receiver exactly receives the distorted signal, it is preferable that the distorted signal is compensated using channel information. At this time, a transmitter and/or the receiver may use a reference signal (RS) to detect the channel information, wherein the reference signal is known by both the transmitter and the receiver. The reference signal may be referred to as a pilot signal.

When the transmitter transmits and receives data by using multiple antennas, it is preferable that a channel state between a transmitting antenna and a receiving antenna is detected, whereby the receiver may exactly receive the data. At this time, it is preferable that each transmitting antenna of the transmitter has a separate reference signal, whereby the receiver may detect the channel state.

A downlink reference signal may include a common reference signal (CRS) shared by all the user equipments within one cell and a dedicated reference signal (DRS) for a specific user equipment only. The transmitter may provide the receiver with information for demodulation and channel measurement by using the reference signals (CRS and DRS). The receiver (for example, user equipment) may measure the channel state by using the CRS, and may feed an indicator related to channel quality, such as a channel quality indicator (CQI), a precoding matrix index (PMI), and/or a rank indicator (RI), back to the transmitter (for example, base station) in accordance with the measured channel state. In the embodiments of the present invention, the CRS may be referred to as a cell-specific reference signal. On the other hand, the reference signal related to feedback of the channel state information (CSI) may be defined as CSI-RS.

The DRS may be transmitted to the user equipments through resource elements if data demodulation on the PDSCH is required. The user equipment may receive the presence of the DRS through upper layer signaling. The DRS is useful only if the corresponding PDSCH signal is mapped. In the embodiments of the present invention, the DRS may be referred to as a user equipment-specific reference signal (UE-specific RS) or demodulation reference signal (DMRS).

FIG. 6 is a diagram illustrating a reference signal pattern mapped into a pair of downlink resource blocks (RBs) defined in a 3GPP LTE-A system.

A pair of downlink resource blocks (RBs) may be set by one subframe on a time domain×twelve subcarriers on a frequency domain as a mapping unit of the reference signal. In other words, a pair of resource blocks on a time axis (axis 'x') have a length of 14 OFDM symbols (see FIG. 6(*a*)) in case of normal cyclic prefix (CP) and have a length of 12 OFDM symbols in case of extended cyclic prefix (CP) (see FIG. 6(*b*)).

Referring to FIG. 6, resource elements (REs) marked with '0', '1', '2' and '3' in each resource block mean the resource elements into which CRS corresponding to each of antenna ports '0', '1', '2' and '3' of the transmitter (for example, base station) is mapped, and resource elements marked with 'D' mean the resource elements into which DRS is mapped.

The CRS is the reference signal that may be received commonly by all the user equipments located within the cell, is distributed on the overall frequency band, and may be used to estimate a channel of a physical antenna. Also, the CRS may be used for channel quality information (CSI) and data demodulation.

The CRS may be defined by various formats in accordance with antenna arrangement at the transmitter (for example, base station). In the 3GPP LTE system (for example, 3GPP Release-8/9), the transmitter may support maximum four transmitting antennas.

When multi input multi output antennas are supported and the reference signals are transmitted from one or more antenna ports, the reference signals are transmitted through specific resource elements in accordance with a predetermined pattern. At this time, a reference signal for one antenna port is not transmitted to a resource element to which a reference signal for another antenna port is transmitted. In other words, the reference signals between different antennas are not overlapped with each other.

2. Method for Estimating Almost Blank Subframe (ABS) Zone

Heterogeneous network/deployments mean that a micro cell for low power/short distance communication exists in a macro cell based homogeneous network. The micro cell may be referred to as a pico cell, a femto cell, a home evolved node B (HeNB), and a relay. Hereinafter, these cells will be referred to as micro cell for convenience of description.

The macro cell (or macro base station) has broad coverage and high transmission power and means a normal cell (or base station) of the wireless communication system. Also, the micro cell (or micro base station) which is a small version of the macro cell may be operated independently while performing most of functions of the macro cell, and means either a cell (or base station) which may be overlaid in a zone covered by the macro cell or a non-overlay type cell (or base station) which may be overlaid in a shade zone where is not covered by the macro cell. The micro cell may accept a smaller number of user equipments at narrower coverage and lower transmission power than the macro cell.

The user equipment may directly be served from the macro cell or the micro cell. Also, in any case, the user equipment existing within coverage of the micro cell may be served from the macro cell.

The micro cell may be classified into two types depending on access limit of the user equipment. The first type is a closed subscriber group (CSG) cell, and means a cell which does not allow access of the existing macro user equipment (user equipment served from the macro cell) or the other micro user equipments (user equipments served from the micro cell) without authentication. The second type is an open access subscriber group (OASC) or open subscriber group (OSC) cell, and means a cell which allows access of the existing macro user equipment or the other micro user equipments.

In the heterogeneous network environment where the macro cell and the micro cell coexist, inter-cell interference may occur more seriously than that of the homogeneous network environment where the macro cell (or micro cell) exists only. In other words, as signals transmitted from the respective cells act as interference between the user equipments located at the boundary of the cells overlapped under the heterogeneous network environment, channel estimation performance of the user equipments may be deteriorated greatly. Channel estimation means a procedure of recovering a received signal by compensating distortion of the signal, which is caused by fading. In this case, fading means that signal strength is rapidly changed due to multipath-time delay in a wireless communication system environment. The reference signal known by both the transmitter and the receiver is required for channel estimation. Also, the reference signal may be referred to as a pilot signal.

In the 3GPP LTE/LTE-A system, a cell-specific reference signal (CRS) is inserted into the first OFDM symbol and the OFDM symbol located at the third location from the last OFDM symbol at each slot on a time axis, and is basically used for the aforementioned channel estimation and RSRP (Reference Signal Received Power)/RSRQ (Reference Signal Received Quality) measurement. In other words, the cell-specific reference signal (CRS) is transmitted through the first, fifth, eighth, and twelfth OFDM symbols (symbols 0, 4, 7, and 11) within each subframe in case of the normal cyclic prefix, and is transmitted through the first, fourth, seventh, and eleventh OFDM symbols (symbols 1, 3, 6, and 10) within each subframe in case of the extended cyclic prefix.

Figure 7:
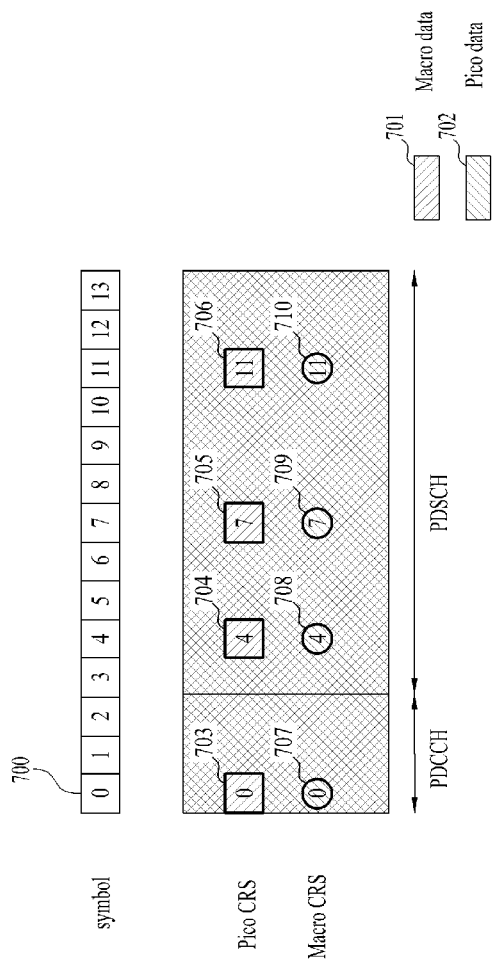
FIG. 7 is a diagram illustrating a subframe corresponding to a case where a macro CRS is not overlapped with a pico CRS in heterogeneous networks where a macro cell and a pico cell coexist.

FIG. 7 is a diagram illustrating a subframe corresponding to a case where a macro CRS is not overlapped with a pico CRS in heterogeneous networks where a macro cell and a pico cell coexist. Hereinafter, the subframe will be described based on a symbol index 700 for clarification of description.

Referring to FIG. 7, a pico CRS 703 located at the symbol 0, a pico CRS 704 located at the symbol 4, a pico CRS 705 located at the symbol 7, and a pico CRS 706 located at the symbol 11 are not overlapped with a macro CRS 707 located at the symbol 0, a macro CRS 708 located at the symbol 4, a macro CRS 709 located at the symbol 7, and a macro CRS 710 located at the symbol 11, respectively.

However, the macro CRS 707, 708, 709 and 710 are overlapped with pico data 702, and the pico CRS 703, 704, 705 and 706 are overlapped with macro data 701. In this case, the macro data 701 includes PDCCH and PDSCH of the macro cell, and the pico data 702 includes PDCCH and PDSCH of the pico cell. In this case, channel estimation performed by the CRS becomes inexact, and the CRS of the other party exists in a data region of the corresponding party, whereby performance is degraded.

Figure 8:
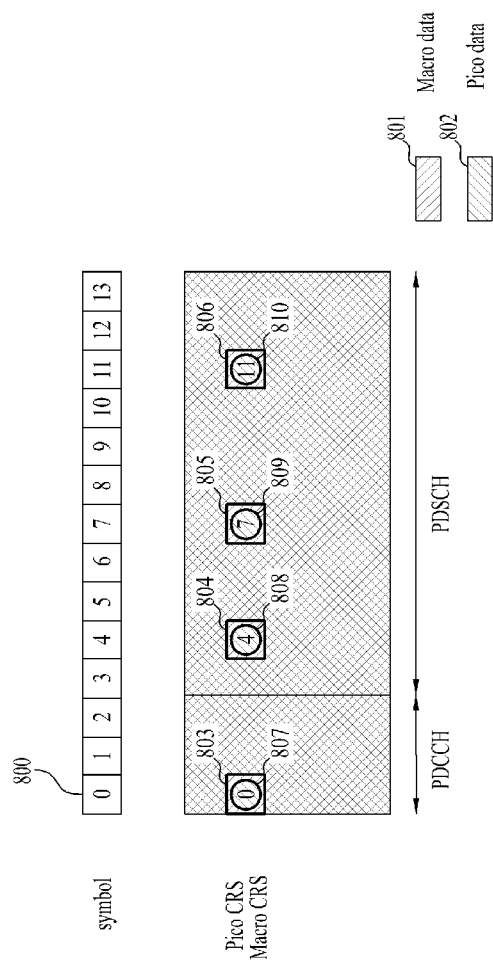
FIG. 8 is a diagram illustrating a subframe corresponding to a case where a macro CRS is overlapped with a pico CRS in heterogeneous networks where a macro cell and a pico cell coexist.

FIG. 8 is a diagram illustrating a subframe corresponding to a case where a macro CRS is overlapped with a pico CRS in heterogeneous networks where a macro cell and a pico cell coexist. Hereinafter, the subframe will be described based on a symbol index 800 for clarification of description.

Referring to FIG. 8, a pico CRS 803 located at the symbol 0, a pico CRS 804 located at the symbol 4, a pico CRS 805 located at the symbol 7, and a pico CRS 806 located at the symbol 11 are overlapped with a macro CRS 807 located at the symbol 0, a macro CRS 808 located at the symbol 4, a macro CRS 809 located at the symbol 7, and a macro CRS 810 located at the symbol 11, respectively. Also, macro data 801 is overlapped with pico data 802. In this case, the macro data 801 includes PDCCH and PDSCH of the macro cell, and the pico data 802 includes PDCCH and PDSCH of the pico cell. Even in this case, channel estimation performed by the CRS becomes inexact, and the CRS of the other party exists in a data region of the corresponding party, whereby performance is degraded.

In this respect, in the 3GPP LTE-A system, studies for enhanced inter-cell interference coordination (eICIC) have been made actively as one of methods of coordinating interference between base stations. According to the method, a cell causing interference may be defined as an aggressor cell or primary cell while a cell affected by interference may be defined as a victim cell or secondary cell, and the aggressor cell or primary cell stops data transmission for a specific subframe, whereby the user equipment may maintain connection with the victim cell or secondary cell for the specific subframe. In other words, in this method, if the macro cell and the micro cell coexist, one base station temporarily stops signal transmission to the user equipment affected by high interference at some zone so as to rarely transmit an interference signal.

The macro cell may be the aggressor cell or primary cell while the micro cell may be the victim cell or secondary cell. By contrast, the micro cell may be the aggressor cell or primary cell while the macro cell may be the victim cell or secondary cell.

In the LTE-A system to which eICIC is applied, for compatibility with the user equipment of the existing LTE system, instead of a separate subframe, a subframe, for which data except for a minimum signal essential for the operation of the user equipment including the CRS are not allocated, is used. In other words, the macro cell provides a subframe called ABS (or ABSF: almost blank subframe) to the user equipment served from the micro cell, especially the user equipment located at the boundary of overlapped cells, whereby the user equipment may be protected from robust interference caused by the macro cell as a downlink control channel and a data channel other than the CRS are not transmitted for the ABS. However, if the ABS is coincident with a multicast broadcast single frequency network (MBSFN) subframe for which no signal is transmitted from a data region, the CRS is not transmitted from the data region of the ABS. In other words, in case of the MBSFN ABS, the other CRSs except for the first CRS (CRS transmitted at the OFDM symbol 0) are removed, whereby interference between the CRSs may be removed at the intervals of the OFDM symbols 4, 7 and 11 including the other CRSs except for the first CRS. Under the eICIC status, a subframe type of each base station may be noted by signal exchange through mutual X2 interface connection between the macro cell and the pico cell. For example, the macro cell or the pico cell exchanges information on the MBSFN subframe and information on the subframe operated as ABS through X2 interface based signaling.

On the other hand, since X2 interface does not exist between the macro cell and the femto cell, ABS pattern which is previously defined is applied to the femto cell through operation, administration and maintenance (OAM). For example, the femto cell may acquire MBSFN subframe information of the macro cell by receiving system information wirelessly broadcasted from the macro cell, or may acquire MBSFN subframe information of the macro cell from a controller of a core network.

Figure 9:
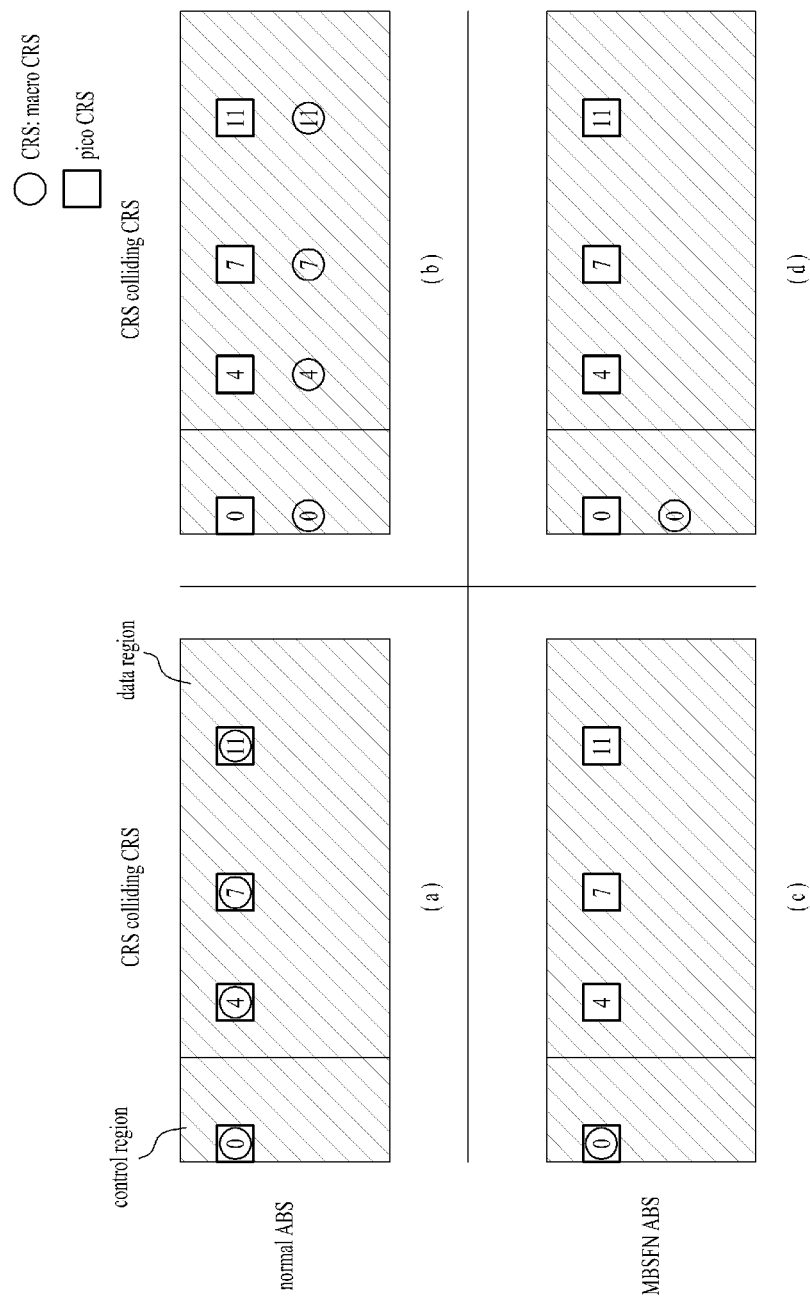
FIGS. 9a, b, c and d are diagrams illustrating an example of an ABS pattern of a macro cell and a pico cell in a system to which eICIC is applied.

FIG. 9 is a diagram illustrating an example of ABS pattern of a macro cell and a pico cell in a system to which eICIC is applied.

Referring to FIG. 9, if eICIC is used, four cases may generally exist in accordance with a signal transmission pattern between two base stations. The ABS is not applied to all the subframes on a time axis, and is shared between the base stations as a certain pattern is generated at the network. However, in a state that the user equipment does not know this information, the user equipment is operated by scheduling of the base station. A predicted result of the user equipment (for example, user equipment that directly receives a service from a pico cell, hereinafter, referred to as 'pico user equipment') that does not consider eICIC will be described for each case on the basis of PDSCH throughput and PDCCH block error rate (BLER) performance.

FIG. 9(a) illustrates normal ABS with colliding CRS. In other words, in FIG. 9(a), when subframe types of the macro cell and the pico cell are normal subframes, the CRS location of the macro cell and the CRS location of the pico cell are the same as each other, wherein the CRSs are overlapped with each other and act as mutual interference. In this case, in view of PDSCH throughput, channel estimation degradation is great, whereby throughput performance degradation of the user equipment is great. Also, in view of PDCCH block error rate performance, channel estimation degradation of the CRS 0 is great and PDCCH block error rate performance degradation is great.

FIG. 9(b) illustrates normal ABS with non-colliding CRS. In other words, in FIG. 9(b), when subframe types of the macro cell and the pico cell are normal subframes, the CRS location of the macro cell and the CRS location of the pico cell are different from each other, wherein mutual interference between the CRSs does not exist. In this case, in view of PDSCH throughput, although channel estimation is normal, since the macro CRS causes interference on a pico data region, throughput performance degradation of the user equipment exists. Also, in view of PDCCH block error rate performance, although channel estimation of the CRS 0 is normal, since the macro CRS causes interference on a data region of the pico cell, PDCCH block error rate performance degradation exists a little.

FIG. 9(c) illustrates MBSFN ABS with colliding CRS. In other words, in FIG. 9(c), when a subframe type of the macro cell is MBSFN subframe and a subframe type of the pico cell is a normal subframe, the locations of the CRS transmitted at the symbol 0 are the same as each other. Since the subframe type of the macro cell is the MBSFN subframe, although no CRS of the macro cell exists at the other symbols 4, 7 and 11, the CRSs transmitted through the symbol 0 are overlapped with each other and act as mutual interference. In this case, in view of PDSCH throughput, if the CRS 0 is used for channel estimation due to interference existing in the CRS 0, throughput performance degradation is generated for channel estimation, and throughput performance degradation is greater than that of FIG. 9(b). Also, in view of PDCCH block error rate performance, channel estimation degradation of the CRS 0 is greater, and PDCCH block error rate performance degradation is great.

FIG. 9(d) illustrates MBSFN ABS with non-colliding CRS. In other words, in FIG. 9(d), when a subframe type of the macro cell is MBSFN subframe and a subframe type of the pico cell is a normal subframe, the locations of the CRS transmitted at the symbol 0 are different from each other. Since the subframe type of the macro cell is the MBSFN subframe, no CRS of the macro cell exists at the other symbols 4, 7 and 11, and the locations of the CRSs transmitted through the symbol 0 are different from each other, whereby mutual interference between the CRSs does not exist. In this case, in view of PDSCH throughput, since no interference exists in the CRS 0, channel estimation occurs normally, whereby throughput performance becomes similar to that of the case where no interference signal caused by the macro cell exists. Also, in view of PDCCH block error rate performance, although channel estimation of the CRS 0 occurs normally, since the macro CRS causes interference on a PDCCH data region of the pico cell, PDCCH block error rate performance degradation exists a little.

As described above, in view of PDSCH throughput performance, performance degradation exists in FIGS. 9(a) to 9(c) except for FIG. 9(d). Also, in view of PDCCH block error rate performance, performance degradation exists in all of FIGS. 9(a) to 9(d). In the system to which eICIC is applied, an operation suitable for eICIC is required to obtain high PDSCH throughput and PDCCH block error rate performance in view of the user equipment. As a result, a UE reception algorithm suitable for eICIC is required.

In the wireless access system where the macro cell and the pico cell coexist, if the macro base station transmits ABS, the pico user equipment existing in the extended region of the pico cell performs a transmission and reception operation in accordance with scheduling of the pico base station. However, since the user equipment does not know information on ABS pattern between the macro base station and the pico base station, scheduling of the pico base station may be coincident with the ABS pattern transmitted from the macro base station or not. In this case, the ABS pattern means the pattern indicating whether each subframe transmitted from the macro base station is ABS. This may cause difficulty in allowing the user equipment to actually adopt a reception algorithm having good performance. A method for allowing a user equipment to estimate whether a scheduled part is ABS zone will be suggested as follows. In particular, if the ABS transmitted from the macro base station is MBSFN ABS not normal ABS, a method for allowing a user equipment to effectively estimate ABS zone will be suggested. Also, although the method will be described on the assumption of a normal cyclic prefix (CP) for convenience of description, the method may equally be applied to an extended CP.

Figure 10:
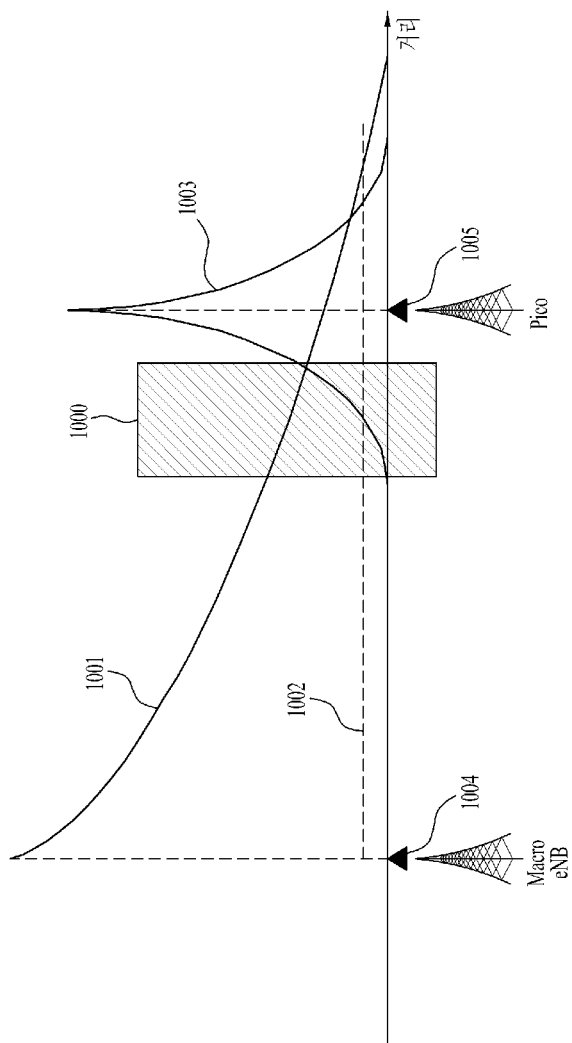
FIG. 10 is a diagram illustrating an example of estimating an ABS pattern of a macro base station by using RSRP of the macro base station and a pico base station according to one embodiment of the present invention.

FIG. 10 is a diagram illustrating an example of estimating an ABS pattern of a macro base station by using RSRP of the macro base station and a pico base station according to one embodiment of the present invention. Hereinafter, for clarification of description, indexes 0 to 13 will be given to symbols constituting a subframe, and description will be made based on the given indexes.

Referring to FIG. 10, a pico user equipment measures RSRP 1003 of a pico base station 1005 and RSRP 1001, 1002 of a macro base station 1004. In this case, the RSRP 1001, 1002 of the macro base station 1004 may be divided into RSRP 1001 of the CRS transmitted from the symbol 0 and RSRP 1002 of the CRS transmitted from the symbols 4, 7 and 11. This is because that CRSs of the macro base station, which are transmitted from the 4th, 7th and 11th symbols, do not exist in MBSFN ABS. An extended region 1000 of the pico cell means a service region of the pico cell, which is extended by reducing a difference value between RSRP 1001 of the macro base station 1004 and RSRP 1003 of the pico base station 1005, wherein the difference value becomes a reference for allowing the user equipment to perform handover between the pico cell and the macro cell. For example, although the user equipment has conventionally performed inter-cell handover when the difference value between RSRP 1001 of the macro base station 1004 and RSRP 1003 of the pico base station 1005 is 0 dB, the user equipment may perform handover when RSRP 1001 of the macro base station 1004 has a value greater than that of RSRP 1003 of the pico base station 1005 as much as 6 dB, whereby the service region of the pico cell may be extended.

The pico user equipment may determine whether the subframe transmitted from the macro base station is MBSFN ABS by comparing RSRP 1001 of the CRS transmitted from the symbol 0 of the macro base station 1004 with RSRP 1002 of the CRSs transmitted from the symbols 4, 7 and 11. This will be described in more detail as follows.

1) The pico user equipment compares RSRP 1001 of the macro CRS transmitted from the symbol 0 with RSRP 1002 of the macro CRSs transmitted from the symbols 4, 7 and 11. If a difference value between the RSRP 1001 of the macro CRS transmitted from the symbol 0 and the RSRP 1002 of the macro CRSs transmitted from the symbols 4, 7 and 11 is greater than a threshold value, the pico user equipment may determine that the macro base station transmits MBSFN ABS.

First of all, the pico user equipment obtains the difference value between the RSRP 1001 of the macro CRS transmitted from the symbol 0 and the RSRP 1002 of the macro CRSs transmitted from the symbols 4, 7 and 11 and then compares the difference value with the threshold value as expressed by the following Equation 1. If the difference value is greater than the threshold value, the pico user equipment may determine that the macro base station transmits MBSFN ABS.

$$\text{Threshold value} < \text{RSRP of macro CRS 0} - \text{RSRP of macro CRS 4}$$

$$\text{Threshold value} < \text{RSRP of macro CRS 0} - \text{RSRP of macro CRS 7}$$

$$\text{Threshold value} < \text{RSRP of macro CRS 0} - \text{RSRP of macro CRS 11} \quad \text{[Equation 1]}$$

Also, two or more values of RSRP 1002 of the macro CRS transmitted from the symbols 4, 7 and 11 may be used together. In other words, the pico user equipment may obtain difference values between RSRP 1001 of the macro CRS transmitted from the symbol 0 and two or more of RSRP 1002 of the macro CRS transmitted from the symbols 4, 7 and 11 and then compare the difference values with the threshold value. At this time, the difference values between two or more of RSRP 1002 of the macro CRSs transmitted from the symbols 4, 7 and 11 are respectively obtained and then compared with the threshold value. And, if any one of the difference values is greater than the threshold value, the MBSFN ABS may be determined, and even in case that the difference values are greater than the threshold value, the MBSFN ABS may be determined. For example, if RSRP 1002 of the macro CRSs transmitted from the symbols 4 and 7 is used, a difference value A between RSRP 1001 of the macro CRS transmitted from the symbol 0 and RSRP 1002 of the macro CRS transmitted from the symbol 4 and a difference value B between RSRP 1001 of the macro CRS transmitted from the symbol 0 and RSRP 1002 of the macro CRS transmitted from the symbol 7 are obtained and then respectively compared with the threshold value. If the value A or B is greater than the threshold value, the pico user equipment may determine that the macro base station transmits MBSFN ABS. If the values A and B are greater than the threshold value, the pico user equipment may determine that the macro base station transmits MBSFN ABS.

Also, the pico user equipment obtains a difference value between RSRP 1001 of the macro CRS transmitted from the symbol 0 and an average value of RSRP 1002 of the macro CRSs transmitted from the symbols 4, 7 and 11 and then compares the obtained difference value with the threshold value as expressed by the following Equation 2. If the difference value is greater than the threshold value, the pico user equipment may determine that the macro base station transmits MBSFN ABS.

$$\text{Threshold value} < \text{RSRP of macro CRS 0} - (\text{RSRP average of macro CRSs 4,7 and 11}) \quad \text{[Equation 2]}$$

2) The pico user equipment may compare RSRP 1001 of the macro CRS transmitted from the symbol 0 with RSRP 1002 of the macro CRSs transmitted from the symbols 4, 7 and 11 and then determine that the macro base station transmits MBSFN ABS if the compared value is greater than the threshold value.

First of all, the pico user equipment may obtain a difference value between RSRP 1001 of the macro CRS transmitted from the symbol 0 and any one of RSRP 1002 of the macro CRSs transmitted from the symbols 4, 7 and 11 and then compare the difference value with the threshold value as expressed by the following Equation 3. If the difference value is greater than the threshold value, the pico user equipment may determine that the base station transmits MBSFN ABS.

RSRP of macro CRS 0−RSRP of macro CRS 4<threshold value

RSRP of macro CRS 0−RSRP of macro CRS 7<threshold value

RSRP of macro CRS 0−RSRP of macro CRS 11<threshold value [Equation 3]

Also, two or more values of RSRP 1002 of the macro CRS transmitted from the symbols 4, 7 and 11 may be used together. In other words, the pico user equipment may obtain difference values between RSRP 1001 of the macro CRS transmitted from the symbol 0 and two or more of RSRP 1002 of the macro CRSs transmitted from the symbols 4, 7 and 11 and then compare the difference values with the threshold value. At this time, the difference values between two or more of RSRP 1002 of the macro CRSs transmitted from the symbols 4, 7 and 11 are respectively obtained and then compared with the threshold value. And, if any one of the difference values is smaller than the threshold value, the MBSFN ABS may be determined, and even in case that the difference values are smaller than the threshold value, the MBSFN ABS may be determined. For example, if RSRP 1002 of the macro CRSs transmitted from the symbols 4 and 7 is used, a difference value A between RSRP 1001 of the macro CRS transmitted from the symbol 0 and RSRP 1002 of the macro CRS transmitted from the symbol 4 and a difference value B between RSRP 1001 of the macro CRS transmitted from the symbol 0 and RSRP 1002 of the macro CRS transmitted from the symbol 7 are obtained and then respectively compared with the threshold value. If the value A or B is smaller than the threshold value, the pico user equipment may determine that the macro base station transmits MBSFN ABS. If the values A and B are smaller than the threshold value, the pico user equipment may determine that the macro base station transmits MBSFN ABS.

Also, the pico user equipment obtains a difference value between RSRP 1001 of the macro CRS transmitted from the symbol 0 and an average value of RSRP 1002 of the macro CRSs transmitted from the symbols 4, 7 and 11 and then compares the obtained difference value with the threshold value as expressed by the following Equation 4. If the difference value is smaller than the threshold value, the pico user equipment may determine that the macro base station transmits MBSFN ABS.

RSRP of macro CRS 0−(RSRP average of macro CRSs 4,7 and 11)<threshold value [Equation 4]

3) The aforementioned methods 1) and 2) may be combined each other. In other words, the pico user equipment may compare RSRP 1001 of the macro CRS transmitted from the symbol 0 with RSRP 1002 of the macro CRSs transmitted from the symbols 4, 7 and 11 and then determine that the macro base station transmits MBSFN ABS if the compared value is greater than a threshold value 1 or smaller eater than a threshold value 2.

First of all, the pico user equipment may obtain a difference value between RSRP 1001 of the macro CRS transmitted from the symbol 0 and any one of RSRP 1002 of the macro CRSs transmitted from the symbols 4, 7 and 11 and then compare the difference value with the threshold value as expressed by the following Equation 5. If the difference value is greater than the threshold value 1 or smaller than the threshold value 2, the pico user equipment may determine that the base station transmits MBSFN ABS.

Threshold value 1<RSRP of macro CRS 0−RSRP of macro CRS 4<threshold value 2

Threshold value 1<RSRP of macro CRS 0−RSRP of macro CRS 7<threshold value 2

Threshold value 1<RSRP of macro CRS 0−RSRP of macro CRS 11<threshold value 2 [Equation 5]

Also, two or more values of RSRP 1002 of the macro CRS transmitted from the symbols 4, 7 and 11 may be used together. In other words, the pico user equipment may obtain difference values between RSRP 1001 of the macro CRS transmitted from the symbol 0 and two or more of RSRP 1002 of the macro CRSs transmitted from the symbols 4, 7 and 11 and then compare the difference values with the threshold value. At this time, the difference values between two or more of RSRP 1002 of the macro CRSs transmitted from the symbols 4, 7 and 11 are respectively obtained and then compared with the threshold value. And, if any one of the difference values is greater than the threshold value 1 and small than the threshold value 2, the MBSFN ABS may be determined, and even in case that the difference values are greater than the threshold value 1 and smaller than the threshold value 2, the MBSFN ABS may be determined. For example, if RSRP 1002 of the macro CRSs transmitted from the symbols 4 and 7 is used, a difference value A between RSRP 1001 of the macro CRS transmitted from the symbol 0 and RSRP 1002 of the macro CRS transmitted from the symbol 4 and a difference value B between RSRP 1001 of the macro CRS transmitted from the symbol 0 and RSRP 1002 of the macro CRS transmitted from the symbol 7 are obtained and then respectively compared with the threshold value. If the value A or B is greater than the threshold value 1 and smaller than the threshold value 2, the pico user equipment may determine that the macro base station transmits MBSFN ABS. If the values A and B are greater than the threshold value 1 and smaller than the threshold value 2, the pico user equipment may determine that the macro base station transmits MBSFN ABS.

Also, the pico user equipment obtains a difference value between RSRP 1001 of the macro CRS transmitted from the symbol 0 and an average value of RSRP 1002 of the macro CRSs transmitted from the symbols 4, 7 and 11 and then compares the obtained difference value with the threshold value as expressed by the following Equation 6. If the difference value is greater than the threshold value 1 and smaller than the threshold value 2, the pico user equipment may determine that the macro base station transmits MBSFN ABS.

Threshold value 1<RSRP of macro CRS 0−RSRP average of macro CRSs 4,7 and 11<threshold value 2 [Equation 6]

3. General Apparatus to which Present Invention May be Applied

Figure 11:
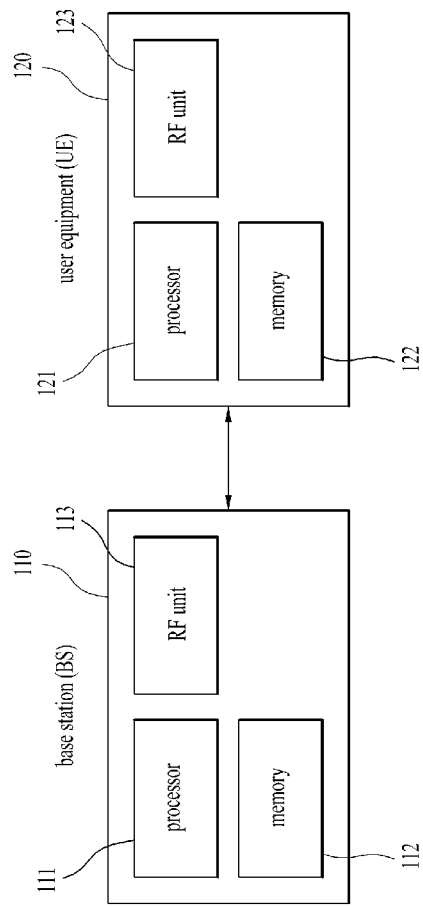
FIG. 11 is a block diagram illustrating a wireless communication apparatus according to one embodiment of the present invention.

FIG. 11 is a block diagram illustrating a wireless communication system according to one embodiment of the present invention.

Referring to FIG. 11, the wireless communication system includes a base station 110 and a plurality of user equipments 120 located within a zone of the base station 110.

The base station 110 includes a processor 111, a memory 112, and a radio frequency (RF) unit 113. The processor 111 may be configured to implement functions, procedures and/or methods suggested in the present invention. Layers of a radio interface protocol may be implemented by the processor 111. The memory 112 is connected with the processor 111 and stores various kinds of information for driving the processor 111. The RF unit 113 is connected with the processor 111 and transmits and/or receives a radio signal.

The user equipment 120 includes a processor 121, a memory 122, and a radio frequency (RF) unit 123. The processor 121 may be configured to implement functions, procedures and/or methods suggested in the present invention. The memory 122 is connected with the processor 121 and stores various kinds of information for driving the processor 121. The RF unit 123 is connected with the processor 121 and transmits and/or receives a radio signal.

The memory 112 or 122 may be located inside or outside the processor 111 or 121, and may be connected with the processor 111 or 121 by means which are well known. Also, the base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting and receiving data in a wireless access system according to the present invention has been described based on the 3GPP LTE system, the method may be applied to various wireless access systems in addition to the 3GPP LTE system.

The invention claimed is:

1. A method for allowing a user equipment to estimate an almost blank subframe (ABS) zone of a macro cell in a wireless access system in which the macro cell and a pico cell coexist, the method comprising the steps of:
   measuring reference signal received power (RSRP) by using a cell-specific reference signal which is inserted into a subframe of the macro cell; and
   determining whether a format of the subframe is a multicast broadcast single frequency network (MBSFN) ABS by comparing a difference value, which is the difference between an RSRP measurement value from an orthogonal frequency division multiplexing (OFDM) symbol 0 of the subframe and an RSRP measurement value from any one of OFDM symbols 4, 7 and 11, with a first threshold value which is previously set.

2. The method according to claim 1, wherein the format of the subframe is determined as MBSFN ABS if the difference value between the RSRP measurement value from the OFDM symbol 0 and an RSRP measurement value from any one of OFDM symbols 4, 7 and 11, is greater than or smaller than the first threshold value which is previously set.

3. The method according to claim 1, wherein the format of the subframe is determined as MBSFN ABS if a difference value, which is a difference between the RSRP measurement value from the OFDM symbol 0 and an average value of RSRP measurement values from OFDM symbols 4, 7 and 11, is greater than or smaller than the first threshold value which is previously set.

4. The method according to claim 1, wherein the format of the subframe is determined as MBSFN ABS if the difference value, between the RSRP measurement value from the OFDM symbol 0 and of an RSRP measurement value from any one of OFDM symbols 4, 7 and 11, is greater than the first threshold value which is previously set, and is smaller than a second threshold value which is previously set.

5. The method according to claim 1, wherein the format of the subframe is determined as MBSFN ABS if a difference value, which is a difference between the RSRP measurement value from the OFDM symbol 0 and an average value of RSRP measurement values from OFDM symbols 4, 7 and 11, is greater than the first threshold value which is previously set, and is smaller than a second threshold value which is previously set.

6. A user equipment for estimating an almost blank subframe (ABS) zone of a macro cell in a wireless access system in which the macro cell and a pico cell coexist, the user equipment comprising:
- a radio frequency (RF) unit that transmits and receives a radio signal; and
- a processor that:
- measures reference signal received power (RSRP) by using a cell-specific reference signal which is inserted into a subframe of the macro cell, and
- determines whether a format of the subframe is a multicast broadcast single frequency network (MBSFN) ABS by comparing a difference value, which is the difference between an RSRP measurement value from an orthogonal frequency division multiplexing (OFDM) symbol 0 of the subframe and an RSRP measurement value from any one of OFDM symbols 4, 7 and 11, with a first threshold value which is previously set.

7. The user equipment according to claim 6, wherein the processor determines that the format of the subframe is MBSFN ABS if the difference value, between the RSRP measurement value from the OFDM symbol 0 and an RSRP measurement value from any one of OFDM symbols 4, 7 and 11, is greater than or smaller than the first threshold value which is previously set.

8. The user equipment according to claim 6, wherein the processor determines that the format of the subframe is MBSFN ABS if a difference value, which is a difference between the RSRP measurement value from the OFDM symbol 0 and an average value of RSRP measurement values from OFDM symbols 4, 7 and 11, is greater than or smaller than the first threshold value which is previously set.

9. The user equipment according to claim 6, wherein the processor determines that the format of the subframe is MBSFN ABS if the difference value, between the RSRP measurement value from the OFDM symbol 0 and an RSRP measurement value from any one of OFDM symbols 4, 7 and 11, is greater than the first threshold value which is previously set, and is smaller than a second threshold value which is previously set.

10. The user equipment according to claim 6, wherein the processor determines that the format of the subframe is MBSFN ABS if a difference value between the RSRP measurement value from the OFDM symbol 0 and an average value of RSRP measurement values from 01-DM symbols 4, 7 and 11, is greater than the first threshold value which is previously set, and is smaller than a second threshold value which is previously set.

\* \* \* \* \*